United States Patent
Craine et al.

(10) Patent No.: US 8,792,854 B2
(45) Date of Patent: *Jul. 29, 2014

(54) METHODS AND SYSTEMS FOR LOCATION-BASED MANAGEMENT OF WIRELESS DEVICES

(71) Applicant: AT&T Intellectual Property I, L.P., Atlanta, GA (US)

(72) Inventors: Ari J. Craine, Marietta, GA (US); John P. Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,888

(22) Filed: Aug. 7, 2013

(65) Prior Publication Data

US 2013/0324073 A1 Dec. 5, 2013

Related U.S. Application Data

(63) Continuation of application No. 13/597,384, filed on Aug. 29, 2012, now Pat. No. 8,515,452, which is a continuation of application No. 11/679,998, filed on Feb. 28, 2007, now Pat. No. 8,285,300.

(51) Int. Cl.
 *H04M 11/04* (2006.01)
 *H04W 24/00* (2009.01)

(52) U.S. Cl.
 USPC .................................. 455/404.2; 455/456.1

(58) Field of Classification Search
 USPC ............. 455/456.1–456.6, 421, 422.1, 404.2, 455/411
 See application file for complete search history.

(56) References Cited

U.S. PATENT DOCUMENTS

| | | | |
|---|---|---|---|
| 6,124,810 | A | 9/2000 | Segal et al. |
| 6,356,841 | B1 | 3/2002 | Hamrick et al. |
| 7,272,493 | B1 | 9/2007 | Hamrick et al. |
| 2005/0151655 | A1 | 7/2005 | Hamrick et al. |
| 2005/0246097 | A1 | 11/2005 | Hamrick et al. |
| 2006/0094447 | A1 | 5/2006 | Zellner et al. |
| 2006/0106537 | A1 | 5/2006 | Hamrick et al. |
| 2006/0253252 | A1 | 11/2006 | Hamrick et al. |

*Primary Examiner* — Michael Faragalla
(74) *Attorney, Agent, or Firm* — Parks IP Law LLC

(57) ABSTRACT

Method and apparatus are for monitoring the location of a wireless device and taking supervisory action in response to that location. Location information obtained from a user's wireless device, or otherwise concerning the present location of the user, is monitored and compared with one or more locations previously approved for that user. An exception is noted if the user reaches a non-approved location, or fails to timely arrive at an approved destination. In response to an exception, supervisory action is taken which may include contacting the wireless device, partially or completely disabling further service of that device, or contacting another person.

20 Claims, 3 Drawing Sheets

METHODS AND SYSTEMS FOR LOCATION-BASED MANAGEMENT OF WIRELESS DEVICES

FIELD OF THE INVENTION

This application relates in general to geofencing management of wireless devices, and more particularly relates to methods and systems for monitoring and supervisory action based on geographic locations of wireless devices.

BACKGROUND

Location-based services for wireless devices are only beginning to become adopted. Such wireless devices may include cell phones and personal digital assistants (PDAs), as well as more application-specific devices intended for use by service persons and other workers. Cell phones and PDAs are typically small in size, so that the individual user can carry such devices on his or her person for example, in a belt holster, a backpack, or a book bag. Purpose-specific wireless devices may be incorporated into vehicle-mounted communications equipment or other apparatus used in connection with the service or field visits of the person, although of course service persons may as well carry individual cell phones or other wireless devices.

Although the service of tracking the geographic locations of wireless devices is known, those services are generally used only to track the location of field service workers, children, or others carrying wireless devices and subscribed to a tracking service. The tracking services may monitor the location of a participating wireless device and periodically prepare reports, based on locations and times of the location information, so that a parent or supervisor may later take action as deemed appropriate. In the case of application-specific wireless devices, such devices may monitor additional inputs, such as vehicle speed and ignition on-off status, and periodically report that information for supervisory attention. However, such prior systems generally do not provide real-time or near-real-time remote management of wireless devices or their features and functions.

SUMMARY

Stated in general terms, systems according to embodiments of the present invention monitor the location of a wireless device and takes one or several supervisory actions if that device is not at an expected location. The expected location may be one or more locations where the wireless device and its user are expected at one or more particular times, such as the user's house or the house of a friend, or a daycare center or other location previously designated or approved by a subscriber of the monitoring service. For the purpose of this disclosure, it should also be understood that an "expected location" can include one or more locations outside of a predetermined geofencing arrangement, namely, locations where the user of the wireless device should not be present. Examples of such excluded locations might include, for example, bars or theatres in the case of service persons in the course of their employment.

Action taken on location information not corresponding to an expected location of a wireless device, e.g., at a particular time, or the location of a wireless device at a location previously determined as unapproved for that wireless device and its user, may take various forms according to embodiments of the present invention. Location information of a wireless device is periodically received and compared with a database or other source containing predetermined location information for that wireless device. If the location information indicates that the wireless device is at other than an expected location, an exception is determined and, in response to the exception, an action is taken. According to embodiments of the present invention, that responsive action may include sending a notification signal to the wireless device, as well as disabling one or more functions of that wireless device. Exception-responsive action may also include sending a message to one or more destinations different from the wireless device whose location is being monitored, for example, to notify a parent or guardian that a child has not arrived at a predetermined location within the time expected for that arrival. Such third-party notification may also operate in several escalating levels, for example, a first level being notification sent to a parent or guardian, followed by a second level of notification sent to a school principle or administrator if the first-level notification is not acknowledged within a certain time. A third level of notification might, for example, provide an alert to local police and/or a local 911 emergency provider.

Location information of the wireless device may be obtained by any suitable technique including techniques known in the art, as discussed below. According to an embodiment of the present invention, location information for a person may also be obtained by sensors or information-reading devices other than cell phones or PDAs. For example, the arrival of a person at a particular location, e.g., a daycare center or a school, may be signaled by swiping or otherwise reading an ID card or other device carried by that person and encoded with readable information identifying the carrier of the card or device. Non-contact sensing devices such as RFID devices may also provide a source of identification information when that device is scanned by a reader as a person carrying the device enters or leaves a particular location. The location information thus derived by scanning or otherwise sensing an information device carried by the person is transmitted, by wire or wirelessly, to the provider of monitoring services. The service provider can compare that location information to a database or other source of information provided for the particular person, to determine whether or not that person has arrived at an expected destination within a predetermined time, for example, within a maximum amount of time after that person departed from a previous location as indicated by location information derived from a wireless device of that person.

Other systems, methods, and/or computer program products according to embodiments will be or become apparent to one with skilled in the art upon review of the following drawings and detailed description. It is intended that all such additional systems, methods, and/or computer program products be included within this description, be within the scope of the present invention, and be protected by the accompanying claims.

DETAILED DESCRIPTION

Figure 1:
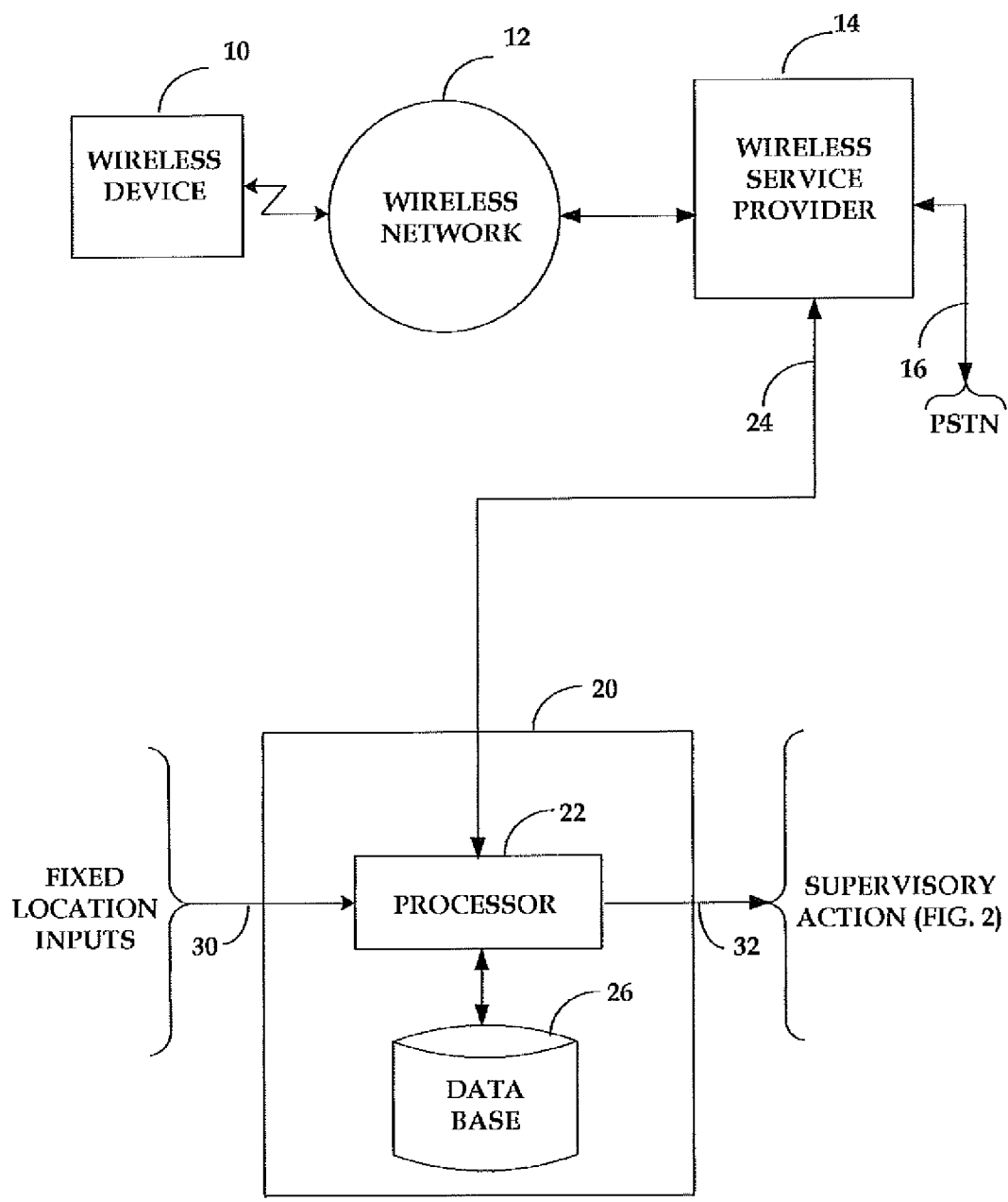
FIG. 1 is a functional block diagram showing monitoring and supervisory management of a wireless device according to a disclosed embodiment of the invention.

FIG. 1 shows in functional terms an apparatus according to a disclosed embodiment for monitoring the location of a wireless device, and by extension the location of a person carrying that wireless device. The wireless devices in that embodiment are indicated generally at 10, and it will be understood that those wireless devices may be cell phones, PDAs equipped for radio communication, or any other wireless device operating for radio communication with a central location or service provider for such wireless devices.

A wireless network 12 is in radio communication with the one or more wireless devices 10. Where the wireless devices 10 comprise cell phones, it will be understood that the wireless network 12 comprises a number of cell sites for radio communication with the wireless devices. The wireless network 12 is operated by a wireless service provider 14, which those skilled in the art will understand as including one or more mobile switching centers each of which may serve more than one cell site. The wireless service provider 14 can establish communication between two or more wireless devices 10 through the wireless network 12, or between a wireless device and one or more landline phones by the interconnection 16 with the public switched telephone network (PSTN) or with other wired or wireless communications networks such as the Internet and Voice Over Internet Protocol (VOIP).

A monitoring service provider 20 according to the disclosed embodiment provides monitoring services for participating wireless devices 10, and receives information from the wireless service provider 14 concerning the identities and geographic locations of those participating wireless devices 10. It should be understood that the services and operations of the monitoring service provider 20 may be provided by a wireless service provider 14 or by an entity separate from the wireless service provider 14, although the two service providers 14 and 20 are shown functionally separated in FIG. 1. In either case, the monitoring service provider 20 provides monitoring and administrative functions for subscribers to the service, based on the identification of one or more wireless device 10 provided to the monitoring service provider 20 by those subscribers. Typical subscribers to the present monitoring and administrative services could be parents concerned with the locations of one or more children caring cell phones or other wireless devices 10, and business operators desiring to monitor and administer activities of their service persons carrying wireless devices 10.

The monitoring service provider 20 includes a processor 22 operatively communicating at 24 with the wireless service provider 14, and a database storage device 26 operatively connected to the processor 22 for receiving and storing information identifying particular wireless devices 10 being monitored and location information for those wireless devices 10. Information concerning the geographic location of the wireless devices 10 may be obtained by any technique known in the art. Such geographic location techniques currently include the global positioning system (GPS) relying on satellite information that can be received by GPS-enabled wireless devices 10. Other current techniques for locating wireless devices 10 include, without limitation, time-difference-of-arrival measurement based on signals transmitted by the wireless device 10 and received at multiple radio towers of the wireless network 12. Techniques for obtaining and processing geographic location information of cell phones and other wireless devices 10 are known to those skilled in the art. See, for example, U.S. Pat. No. 7,110,749, assigned to the assignee of the present invention and hereby incorporated by reference.

The monitoring service provider 20 may also receive location inputs from one or more sources other than the location information specific to the wireless devices 10. Those sources appear in FIG. 1 as the one or more fixed location inputs 30, with the understanding that "fixed" is herein used to denote location-based information derived from one or more sources other than the wireless devices 10. As previously mentioned, examples of fixed information inputs 30 include information-card scanners or readers associated with a building or room containing, for example, a nursery school or day-care center, and RFID sensors that produce a unique signal when a person carrying an RFID device moves within a certain proximity to the sensor. A keypad entry device, onto which a person entering or leaving a particular location would enter a personal ID code, is another possible source of fixed location input information. Whatever the source, the one or more fixed location inputs 30 are supplied to the processor 22 of the monitoring service provider 20 through any suitable data link include wireless or wireline connections and using Internet Protocol (IP) or any other suitable data-transfer technique.

The monitoring service 20 compares the location information received for a wireless device 10 with the expected geographic location information supplied by a subscriber to the service and stored on the database 26, as discussed below. If the comparison indicates that the wireless device 10 is not at an approved location, the monitoring service provider 20 notes an exception and initiates one or more supervisory action outputs at 32. Examples of such supervisory actions are discussed below with reference to FIG. 2.

Figure 2:
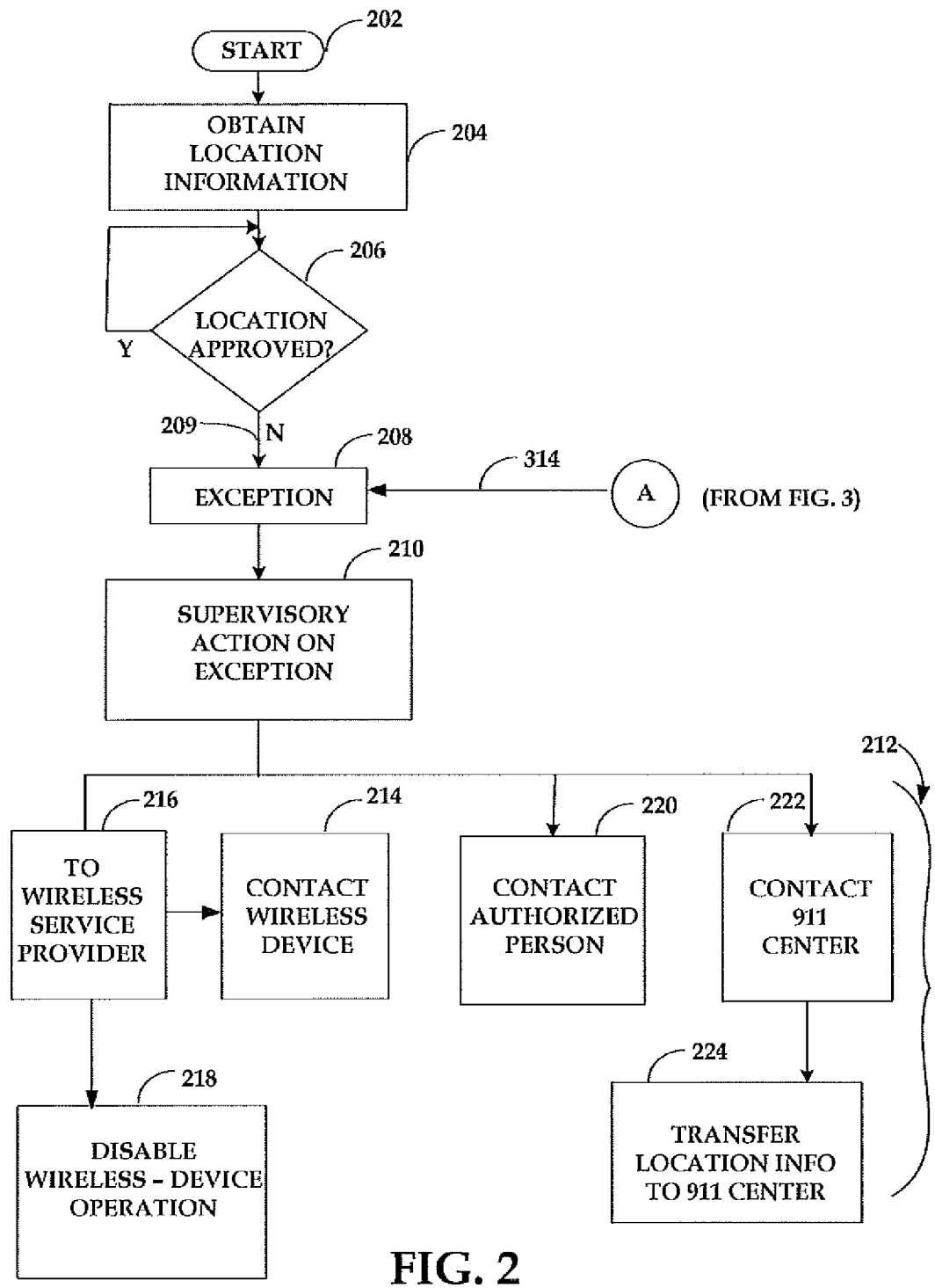
FIG. 2 is a flow chart representing operation of the embodiment according to FIG. 1.

FIG. 2 illustrates an example of monitoring and supervising the wireless device 10 according to the embodiment of FIG. 1. At the start 202 of the process illustrated in FIG. 2, it is assumed that a subscriber or account holder of the monitoring service has registered, with the monitoring service provider 20, at least one wireless device 10 whose location and movement is to be monitored. That registration would typically include providing a unique identifier of the wireless device 10, such as the unique Manufacturer's Identification Number and/or the telephone number associated with a cell phone whose location is to be monitored, or some other unique identifier such as the IP address in the case of a wireless device communicating over the Internet. Registration with the monitoring service provider would also include identifying at least one expected location or other geographic location of interest to the subscriber. Such geographic locations could include, for example, the location of one or more places where the wireless-device user is expected to be present, and/or locations that are not approved for visit by the user of a particular wireless device 10. Furthermore, the subscriber may provide time- or date-relevant information pertaining to one or more locations, denoting approved times for arriving at or departing from particular locations. Such times may be absolute ("Leave the party at location X by 11 p.m.") or relative, e.g., arrival at the location of a certain day-care center within 30 minutes after departing a particular school or other certain location. The information furnished to the monitoring service provider 20 by a subscriber is stored on the database 26 by the processor 22.

Referring again to FIG. 2, location information is obtained at 204 from a participating wireless device 10. That location information may be obtained at periodic intervals, as known in the art. The processor 22 of the monitoring service provider 20 compares that location information at 206 with approved location information previously stored in the database 26, with that comparison continuing unless the comparison of location information shows at 209 that that the wireless device 10 is at an unapproved location. In that latter case, the processor 22 at 208 notes an exception and at 210 initiates one or more predetermined supervisory actions in response to the exception, as shown by the output 32 on FIG. 1. Exemplary supervisory actions according to the embodiment shown in FIG. 2 are identified at 212. For example, the monitoring service provider 20 may at 214 contact the wireless device 10, working through the wireless service provider 14 for that wireless device as shown at 216. Contacting the wireless device 10 as at 214 may include a short audible and/or visual message appearing on the wireless device 10, or may produce a characteristic ring tone, buzz, or vibration depending on the alerting capabilities of the particular wireless device 10.

Supervisory action may also include partial or full disablement of operation of the wireless device 10, as indicated at 218. For example, the operation of a participating wireless device 10 would be temporarily restricted to block outgoing calls to anyone other than certain phone numbers identified by the subscriber (e.g., parent or supervisor numbers) and 911 emergency calls. Disabling operation of the wireless device 10 at 218 could occur concurrent with contacting that wireless device 10 as at 214, so that the user of that wireless device 10 would receive a message alerting the user of arrival at an unapproved location and that operation of the wireless device 10 was thereafter restricted until being reset at the discretion or control of the monitoring-service subscriber.

Supervisory action may also comprise contacting one or more authorized persons as at 220. Examples of authorized persons include one or both parents, a school administrator, or a supervisor of a service person carrying a wireless device 10 being monitored. Such alerting contacts to other recipients are initiated by the monitoring service provider 20 as indicated at 32 in FIG. 1, and may include initiating one or more messages to addresses such as wireline or wireless phone numbers or IP addresses previously furnished to the monitoring service provider 20 by the subscriber. That monitoring service provider 20 may establish a hierarchy of authorized contacts, with an initial contact attempted to a first parent, and thereafter a contact to a second parent, followed by a contact to an administrator or other person if no preceding contact attempt is completed or acknowledged within a predetermined amount of time.

It is also within the purview of the present system to take supervisory action by contacting a 911 emergency call center as at 222. Any such 911 contact could also transfer the last-available location information of the wireless device 10 to the 911 center as at 224. Such emergency contact action may be appropriate only in certain situations, such as monitoring the location of a child or an elderly person who might be unable to seek emergency assistance.

Figure 3:
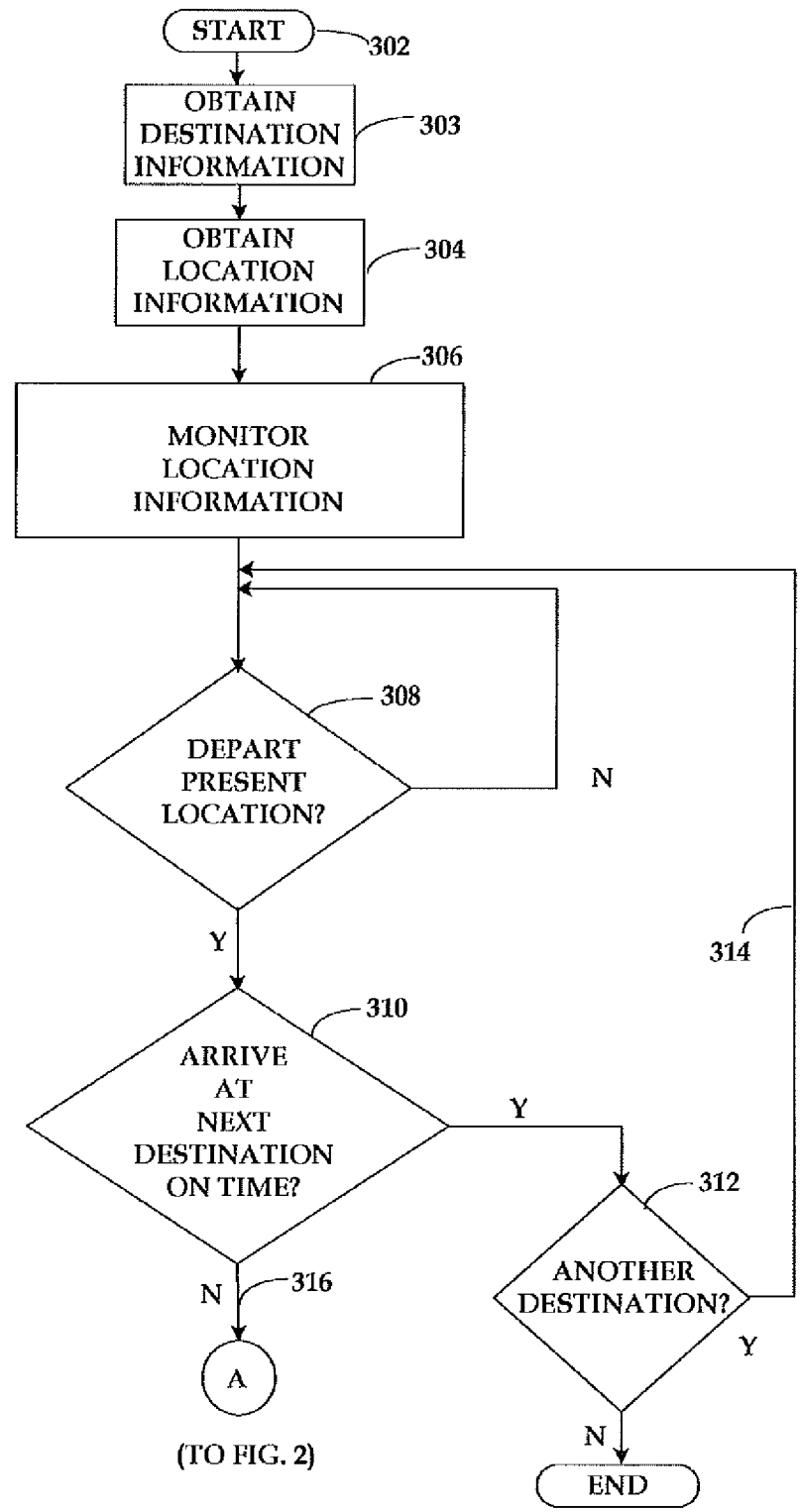
FIG. 3 is a flow chart illustrating operation of an alternative disclosed embodiment according to the present invention.

FIG. 3 shows another embodiment for monitoring and supervisory control of the wireless device 10 according to a modified embodiment of the present invention. The method shown with respect to FIG. 3 starts at 302 and obtains destination information at 303 relating to one or more scheduled destinations for an individual. That destination information may include a time the person is expected to arrive at a particular destination, and each such time may be expressed either as an absolute time of day or as a relative time after received location information indicates that person has left a previous destination. Examples of destination information include the location of a daycare center or other post-school destination for a minor person, as well as a post-daycare destination (e.g., a friend's house) for that person. Intended destinations for service persons might include customer visits scheduled for that person throughout a work period.

The method according to FIG. 3 also obtains location information at 304 of the wireless device 10, as with the corresponding element 204 described above with respect to FIG. 2. Obtaining location information of the wireless device 10 at 304 may be accomplished using geographic location information received from the wireless service provider 14 as described above. Alternatively, the present location of the wireless-device 10 user may be obtained from a fixed-location input 30 as described with respect to FIG. 1. For example, a person may present an identification card or other device when entering a particular location, and that information is transmitted to the monitoring service provider 20 from the sensor at that fixed location. A later departure of that person from the location may likewise be obtained either by geographic-location information derived from the wireless device 10, or from a fixed-location input as the person scans an identification reader when exiting that location.

The method of FIG. 3 monitors location information of the wireless device 10 at 306, and at 308 determines whether that wireless device 10 has departed a present location. If the wireless device 10 has departed the present location, then the processor 22 determines at 310 whether or not the person has timely arrived at the next destination previously scheduled at 303. That destination arrival is determined from the location information either as obtained from the wireless device 10 carried by the person, or by a fixed-location input 30 derived from the next location. Assuming a timely arrival at that next location, the process moves to 312 where the processor 22 sees whether information concerning another destination for that person is in the system. If another destination is present, then at 314 the processor 22 returns to determining whether the person has departed from the current present location as at 308. However, if at 312 the processor 22 determines that no other destination is scheduled for that person, the process ends.

If the processor 22 determines at decision 310 that the person has not arrived at the predetermined next destination within the time set for that arrival, then at 316 the processor 22 branches to note an exception at 208 on FIG. 2, and to take appropriate supervisory action on that exception as at 210 and 212 on FIG. 2. As discussed above, what may constitute appropriate action depends on the circumstances and the person being monitored; an appropriate supervisory action for a service person not timely arriving at the next scheduled customer location would likely be different from the action to be taken when a child has not reached a destination within a certain amount of time after departing a previous location.

It should also be understood that the foregoing relates only to disclosed embodiments of the present invention and that numerous changes and modifications therein may be made without departing from the spirit and scope of the invention as defined in the following claims.

The invention claimed is:

1. A method, comprising:
   receiving location information identifying a first geographic location of a wireless device;
   receiving information identifying a time of departure from the first geographic location by the wireless device;
   determining, by a processor, whether the wireless device arrives at one of multiple second expected geographic locations within a predetermined amount of time after the time of departure from the first geographic location;
   responsive to determining that the wireless device does not arrive at one of the multiple second expected geographic locations within the predetermined amount of time sending, by the processor, an instruction to take supervisory action, wherein the supervisory action includes disabling a function of the wireless device so that the wireless device is not able to perform the function.

2. The method of claim 1, wherein the supervisory action further includes sending a message to at least one other device among a plurality of other devices based upon a predetermined hierarchy of contact addresses of the plurality of other devices.

3. The method of claim 1, wherein the supervisory action further includes determining whether predetermined conditions associated with a user of the wireless device are met.

4. The method of claim 3, wherein the supervisory action further includes, responsive to determining that the predetermined conditions are met, sending a message to an emergency call center.

5. The method of claim 4, wherein the message that is sent to the emergency call center includes last-available location information identifying a last-known geographic location of the wireless device.

6. The method of claim 1, wherein the information identifying the time of departure from the first geographic location is received from the wireless device.

7. The method of claim 1, wherein the information identifying the time of departure from the first geographic location is received from a device associated with the first location.

8. A system, comprising:
 a processor; and
 a memory having stored thereon computer-readable instructions that, when executed by the processor, cause the processor to perform operations comprising:
  receiving location information identifying a first geographic location of a wireless device;
  receiving information identifying a time of departure from the first geographic location by the wireless device;
  determining whether the wireless device arrives at one of multiple second expected geographic locations within a predetermined amount of time after the time of departure from the first geographic location; and
  responsive to determining that the wireless device does not arrive at one of the multiple second expected geographic locations within the predetermined amount of time, sending an instruction to take supervisory action, wherein the supervisory action includes disabling a function of the wireless device so that the wireless device is not able to perform the function.

9. The system of claim 8, wherein the supervisory action further includes sending a message to at least one other device among a plurality of other devices based upon a predetermined hierarchy of contact addresses of the plurality of other devices.

10. The system of claim 8, wherein the supervisory action further includes determining whether predetermined conditions associated with a user of the wireless device are met.

11. The system of claim 10, wherein the supervisory action further includes, responsive to determining that the predetermined conditions are met, sending a message to an emergency call center.

12. The system of claim 11, wherein the message that is sent to the emergency call center includes last-available location information identifying a last-known geographic location of the wireless device.

13. The system of claim 8, wherein the information identifying the time of departure from the first geographic location is received from the wireless device.

14. The system of claim 8, wherein the information identifying the time of departure from the first geographic location is received from a device associated with the first location.

15. A non-transitory computer readable storage device having instructions stored thereon that, when executed by a processor, cause the processor to perform operations comprising:
 receiving location information identifying a first geographic location of the wireless device;
 receiving information identifying a time of departure from the first geographic location by the wireless device;
 determining whether the wireless device arrives at one of multiple second expected geographic locations within a predetermined amount of time after the time of departure from the first geographic location;
 responsive to determining that the wireless device does not arrive at one of the multiple second expected geographic locations within the predetermined amount of time, sending an instruction to take supervisory action, wherein the supervisory action includes disabling a function of the wireless device so that the wireless device is not able to perform the function.

16. The non-transitory computer readable storage device of claim 15, wherein the supervisory action further includes sending a message to at least one other device among a plurality of other devices based upon a predetermined hierarchy of contact addresses of the plurality of other devices.

17. The non-transitory computer readable storage device of claim 15, wherein the supervisory action further includes:
 determining whether predetermined conditions associated with a user of the wireless device are met; and
 responsive to determining that the predetermined conditions are met, sending a message to an emergency call center.

18. The non-transitory computer readable storage device of claim 17, wherein the message that is sent to the emergency call center includes last-available location information identifying a last-known geographic location of the wireless device.

19. The non-transitory computer readable storage device of claim 15, wherein the information identifying the time of departure from the first geographic location is received from the wireless device.

20. The non-transitory computer program product of claim 15, wherein the information identifying the time of departure from the first geographic location is received from a device associated with the first location.

* * * * *